Feb. 19, 1952 W. C. CARLTON 2,585,914
DEVICE FOR PROTECTING AND PRESERVING THE
TIRES OF WHEELED VEHICLES
Filed May 25, 1948 2 SHEETS—SHEET 1
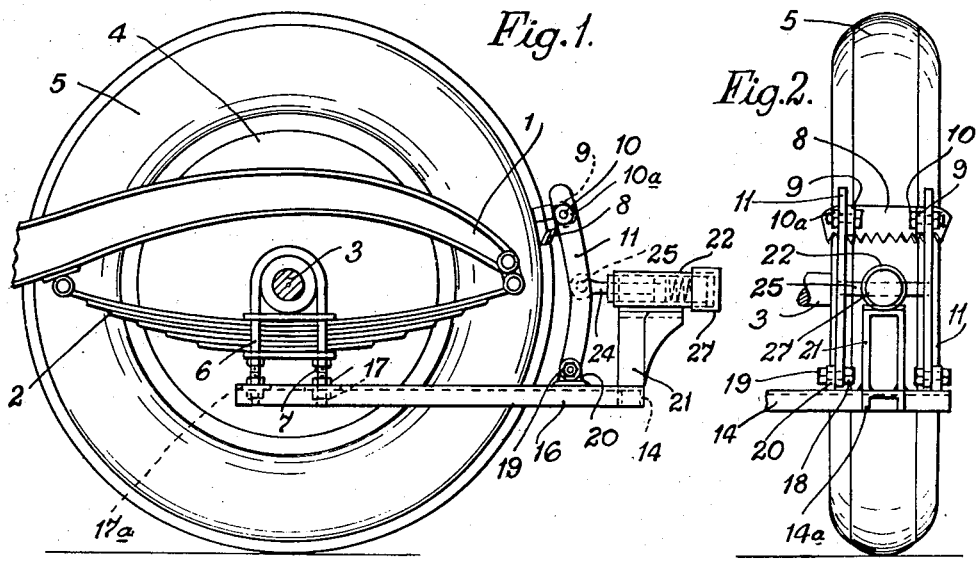
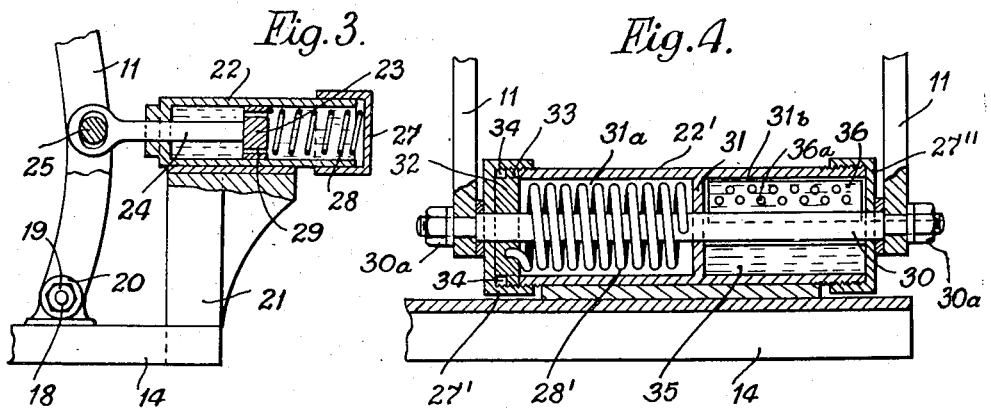
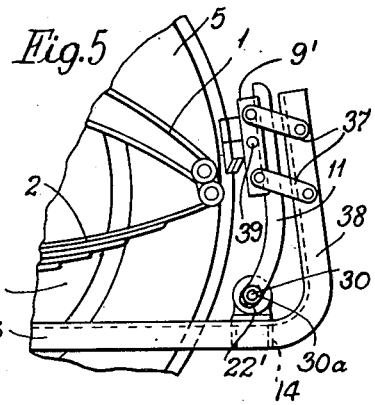
INVENTOR
WILLIAM C. CARLTON
By Young, Emery & Thompson Attys.

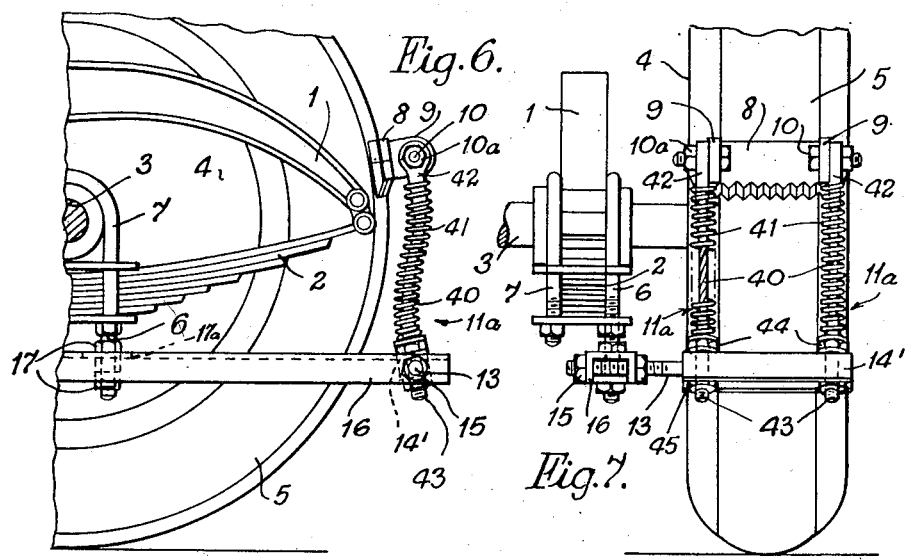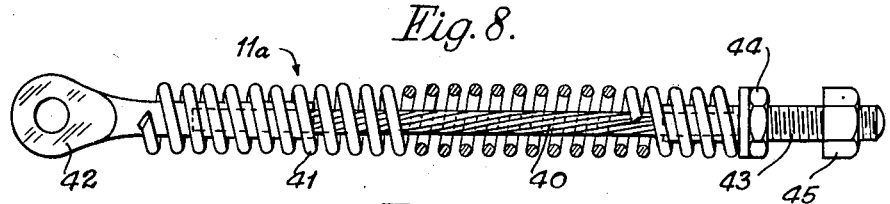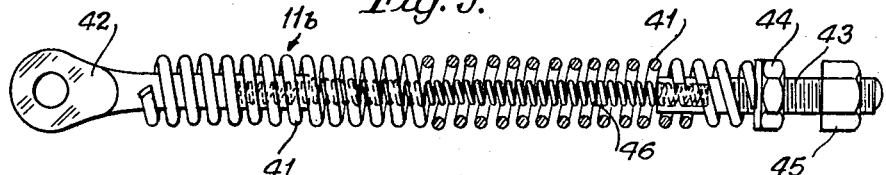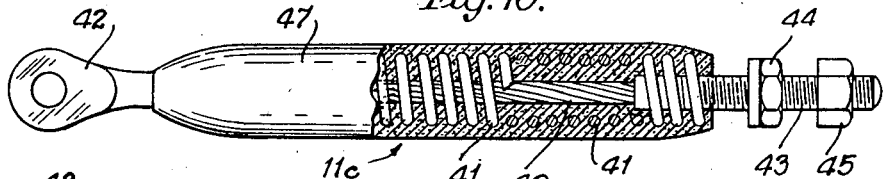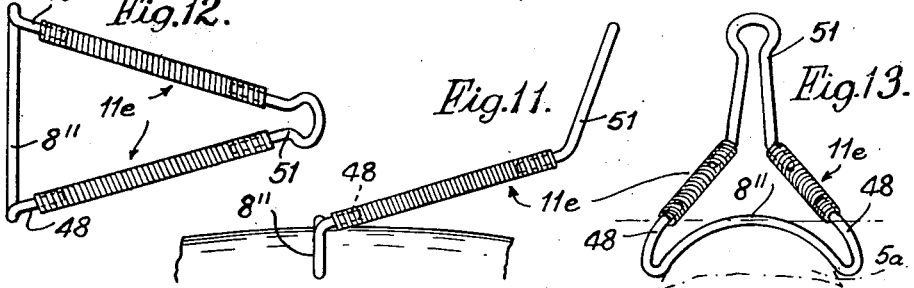

Patented Feb. 19, 1952

2,585,914

UNITED STATES PATENT OFFICE 2,585,914

DEVICE FOR PROTECTING AND PRESERVING THE TIRES OF WHEELED VEHICLES

William C. Carlton, Hornchurch, England

Application May 25, 1948, Serial No. 29,143
In Great Britain November 11, 1947

21 Claims. (Cl. 280—158)

The present invention relates to devices for protecting and preserving the tyres of motor vehicles and other wheeled vehicles, and is applicable with particular advantage to the protection and preservation of tyres of rubber, or other resilient substances, such as are usually applied to motor cars, lorries, motor omnibuses, bicycles, and other road vehicles and aircraft.

In order to maintain the tyres of vehicles in good condition, and to obtain the maximum length of service therefrom, it is necessary as far as possible to prevent any nails or other metallic objects, flints, stones, or other foreign bodies from adhering to, and becoming embedded in, the tyre surfaces, and for this purpose it has previously been proposed to provide mechanical devices for deflecting or extracting from the tyre surfaces such bodies which have collected thereon, so as to prevent the said bodies from subsequently becoming embedded in the tyre.

I at present prefer to mount my tyre-protecting and preserving devices so that the extractor or deflector blade or equivalent means is yieldingly maintained in comparatively light contact with the tyre surface to be protected or is adapted lightly to contact the said tyre surface during rotation of the tyre. By "tyre surface" is meant the tyre surface per se or the extraneous matter with which the tyre surface may become coated by contact with the road. Moreover, I have found it to be necessary or, at least, highly desirable to arrange for the extractor or deflector blade or equivalent means to be readily deflected from its operative position and clear of the tyre surface to enable the foreign bodies extracted or deflected thereby to pass freely between the tyre surface and extractor means in a rolling and/or sliding motion without damage to the tyre surface.

Now, by reason of the extractor or deflector blade being yieldingly held in the operative position by a readily yielding and resilient force, the blade may vibrate and eventually commence to hammer or bounce, without regard to the condition of the tyre surface, when the tyre is travelling at speed upon a road surface which is rough or worn or built into ridges. Moreover, some undesirable effects may arise if the tyre surface assumes a wave-like or ridged form in wear or is built with such a surface. The effect may well be that the extractor or deflector blade or tyre-contacting means associated therewith will tend to jump or skip from the undulations of the tyre surface as the speed of rotation of the tyre increases. Thus, the extractor or deflector blade may commence to vibrate and the vibration may develop into a hammering or bouncing action, particularly if the speed of rotation of the tyre becomes such as to produce periodic or sympathetic vibration of the blade and its mountings.

Such hammering or bouncing will obviously detract from the efficiency of the tyre-protecting or preserving device since it will produce an undesirably wide gap of varying width between the tyre surface and extractor or deflector blade when the tyre is rotating at speed and may also lead to fatigue and failure of the structure of the device. The vibrating movement of the extractor or deflector blade may, of course, be considerably reduced or obviated by appropriately increasing the resilient force which is used for urging the blade towards the tyre surface, or by providing such a force, but a resilient force which is sufficient for the stated purpose will tend to cause the blade or its equivalent or the associated tyre-contacting means to press unduly heavily upon the tyre surface thereby leading to overheating and excessive wear of both tyre and blade or other tyre-contacting means and possibly to actual damage to the tyre surface by causing the extracted or deflected foreign bodies to score the said surface whilst passing between the said extractor or deflector means and tyre surface.

The present invention has for its primary object to obviate the above described disadvantages in the operation of the tyre-protecting or extracting device.

With the above object in view, according to the present invention, I provide a tyre-protecting or preserving device comprising an extractor or deflector blade or equivalent member, means for yieldingly holding the extractor or deflector member in operative position in relation to the tyre surface which is to be protected thereby, and means for damping the movement imparted to the extractor or deflector member by irregularities or uneven formation of the said tyre surface or vibration of the tyre and/or associated wheel mountings.

The word damping as far as this patent application is concerned is to be taken in a sense which has come to be understood as damping in engineering as outlined hereafter. The applicant realizes that almost any body vibrating in air is damped to a certain degree by the air around it and by friction set up within itself, but the degree is so small that engineers neglect it. To illustrate this point by examples: A tuning fork vibrating in air would, from the desired viewpoint, be considered to be vibrating freely; if permitted to vibrate in a vacuum it would be considered that steps had been taken to prolong the time of vibration; and if a flat disc large enough to encounter a considerable body of air were fixed to a fork it would be considered that steps had been taken to damp the vibration; a similar result could be obtained by placing the human finger on the fork. To give another example, a normal leafed suspension spring on an automobile is considered from the desired viewpoint to be damped when a shock absorber is fitted or when brake lining is interspaced between the leaves. To give a further example, a string vibrating in air would, from the desired viewpoint, be considered to be vibrating freely, while the same string vibrating in oil would be considered as damped. It will further be remembered that damping can be achieved by utilizing as supports materials which by reason of their composition return sluggishly to normal after deflection.

According to one feature of the invention, the damping of the movement of the extractor or deflector blade or equivalent member may be effected by controlled fluid flow means e. g. a hydraulic dash-pot device or bleed-valve device.

According to another feature of the invention, the extractor or deflector blade or equivalent member may be mounted upon an inherently resilient and/or flexible supporting member incorporating means for damping the vibration of the said resilient supporting members and extractor or deflector means mounted thereon.

In order that the invention may be clearly understood and readily carried into effect, several constructional embodiments thereof are hereinafter described, by way of example and without implied limitation, by reference to the accompanying drawings in which:

Figs. 1 and 2 are side and rear end elevations respectively of one form of tyre-protecting and preserving device embodying hydraulic movement-damping means according to the present invention and shown applied to the pneumatic tyre of one of the rear wheels of a road vehicle;

Fig. 3 is a sectional detail view of the hydraulic movement-damping means of Fig. 1 drawn to a larger scale;

Fig. 4 is a sectional elevation of an alternative form of hydraulic movement-damping means for carrying the invention into effect;

Fig. 5 is a side elevational view of an alternative form of tyre-protecting and preserving device embodying the hydraulic movement-damping means shown in Fig. 4;

Figs. 6 and 7 are side and rear end elevations respectively of another form of tyre-protecting and preserving device embodying an alternative form of movement-damping means for carrying the invention into effect;

Fig. 8 is a part sectional elevation, drawn to a larger scale, of the flexible and resilient mounting arm and movement-damping device shown in Figs. 6 and 7;

Figs. 9 and 10 are similar part sectional views of alternative constructional forms of flexible and resilient mounting arm and movement-damping devices;

Figs. 11, 12 and 13 are a side elevation, plan and front elevation respectively of a further embodiment of the invention.

Referring to Figs. 1, 2, 6 and 7 of the accompanying drawings, 1 indicates the rear dumb iron of the vehicle chassis, 2 the associated rear suspension spring, 3 the rear axle upon which the rear wheel 4 equipped with a pneumatic tyre 5 is mounted, and 6, 7 the spring clips or U-bolts which secure the spring 2 to the axle 3.

The tyre-protecting and preserving device, which may be in any of the forms described in the specification of my co-pending United States Patent Application Serial No. 717,018 filed December 18, 1946 now Patent No. 2,501,886, or may consist of a clearing bar or a taut chain or cable comprises, in the form shown, a serrated extractor or deflector blade 8 which may be sufficiently long to extend across the entire width of the tread or road-contacting surface of the tyre 5 to which it is applied and may be suitably curved as shown or otherwise provided with a concave surface to accommodate the transverse curvature of the said tyre surface. The said serrated blade 8 is provided with mounting brackets 9, as shown, adjustably secured to the upper ends of a pair of supporting arms 11 or 11a or a plurality of such arms, by means, for example, of shackle bolts 10 which are passed through holes in the brackets and through eyes formed at the ends of supporting arms 11 or 11a. The blade 8 may be adjusted to and fixed in any desired angular position relative to the supporting arms by means of threaded nuts 10a applied to the screw-threaded ends of the shackle bolts 10, although if so desired the said blade brackets and arms may be secured together in fixed relation e. g. by riveting or welding.

The supporting arms are carried upon a mounting bar 14 or 14' which is secured to or formed as an integral part of a supporting bar 16, and is set to extend across the road-surface of the tyre 5 and preferably in substantially parallel relation to the axis of rotation of the wheel and tyre.

The bar 16 is secured at its inner end to the wheel suspension system and to this end is provided with elongated holes or short slots 17a to receive the downwardly extended screw-threaded ends of the spring clip 6 to which the bar is rigidly secured by means of screwthreaded nuts 17. The bar 16 may thus be adjusted both angularly and longitudinally in relation to the wheel suspension system.

In the embodiment of the invention shown in Figs. 1, 2 and 3, the arms 11 are each formed from a length of rigid material e. g. steel strip which is bent to form angularly offset limbs. The lower ends of the arms are pivotally connected by threaded bolts 18 and nuts 19 to hinge brackets 20 which are secured in laterally spaced relation to the mounting bar 14. A saddle 21 mounted upon an extension 14a of the mounting bar 14 provides a seat for the cylinder 22 of a hydraulic movement damping device which is adapted to maintain the extractor or deflector blade 8 in operative relation to the tyre 5. As clearly shown in Fig. 3, the hydraulic cylinder 22 contains a piston 23 which is coupled by a connecting rod 24 to a bar 25 extending between and secured to the arms 11. The cylinder 22 contains a freely flowing fluid e. g. oil, and the rear end thereof is closed by a screw threaded cap 27. A helical compression spring 28 is interposed between the piston 23 and the cap 27 so as constantly to urge the piston towards the forward end of the cylinder 22, and thus to press the extractor or deflector blade 8 against the tyre 5. The degree of pressure exerted by the spring 28 upon the piston 23 and blade 8 may be varied by adjustment of the screw threaded cap 27 along the end of the cylinder 22. The piston 23 is provided with bleed holes 29 which extend therethrough from one diametrical face to the other. The bleed holes 29 permit the fluid to flow at a controlled rate from one side to the other of the piston and thus control or determine the speed at which the piston is permitted to move along the cylinder. A clearance between the walls of the cylinder and piston may be provided for the same purpose.

By the arrangement above described, the degree of pressure exerted by the blade 8 upon the tyre surface is determined by the strength and loading compression of the spring 28, whereas the speed at which the arms 11 and blade 8 are permitted to move is determined by the rate of movement of the piston 23 in the fluid-filled cylinder 22. The arrangement is such that the spring-loaded hydraulic movement-damping means will urge the blade-mounting means towards the tyre and thus lightly press the said blade against the tyre surface. As the tyre revolves the blade will be forced out to the highest point on the tyre surface, and the piston of the spring-loading and damping means is correspondingly displaced in its cylinder as fluid flows through the bleed hole or holes therein from one side of the piston to the other. The movement of the blade is damped by the movement of the piston in the fluid-filled cylinder and is determined according to the rate of flow of the fluid from one side to the other of the piston, which rate of flow may be related to the speed of rotation of the tyre in such a manner that the blade is displaced so as to follow the radial displacement of an eccentric tyre surface and thus remain in substantially the same setting in relation to the tyre surface as the latter revolves while the movement of the blade is damped i. e. rendered sufficiently slow to prevent it from precisely following the contour of a tyre surface which is worn as above described. Thus the blade will normally be prevented by the damping device from moving radially outwards beyond the highest point of the tyre and from entering into a bouncing or hammering movement but will preferably be adapted to be moved away from the tyre to permit the passage between the tyre surface and the blade of a foreign body which is being removed from the tyre by the blade. Means may be provided for adjusting the rate of flow of the fluid through the bleed holes of the hydraulic piston. Tension spring means may be used for loading the hydraulic piston instead of, or in addition to, the compression spring means described above.

The spring-loading and hydraulic damping devices for carrying the present invention into effect may assume many different forms. For example, as shown in Fig. 4, the hydraulic damping device is of the oscillating vane type and is adapted to provide a pivotal mounting for the blade-supporting arms 11. In this case, a cylinder 22' is mounted, preferably in an adjustable manner, upon the bar 14, with its longitudinal axis parallel with the axis of rotation of the vehicle wheel 4.

The ends of the cylinder are closed by screw-threaded caps 27', 27" and the cylinder bore is subdivided by a diametrical wall 31 into two separate chambers 31a, 31b. The end caps and diametrical wall provide bearings for an axle 30 which extends end to end of the cylinder in coaxial relation thereto, and the shouldered and screwthreaded ends of the axle project outwards through the cylinder ends and caps to receive the lower ends of the blade-supporting arms 11 which are clamped thereto in an angularly adjustable manner by means of threaded nuts 30a.

The axle 30 is spring-loaded by a helical torsion spring 28' which is contained in the cylinder chamber 31a and surrounds the axle. One end of the spring 28' is secured to the axle and the other end thereof is anchored to a stationary plate 32 having peripheral lugs 33 which enter slots 34 formed in the end of the cylinder 22'. By providing a series of such slots 34 around the end of the cylinder, the plate 32 may be angularly adjusted to vary the loading torque of the spring 28' and thus determine the degree of pressure applied by the said spring to the axle 30, arms 11 and blade 8.

In order to dampen the oscillatory movement of the spring-loaded axle and blade-supporting arms and blade carried thereby, the chamber 31b of the cylinder 22' is provided with a fixed radial vane 35 and the axle 30 is fitted with a similar radial vane 36 which is set in the chamber 31b so as to oscillate relatively to the fixed vane 35. The chamber 31b is made substantially fluid-tight and filled with a suitable smooth flowing fluid such as oil and the vane 36 is provided with bleed holes 36a to permit the fluid to flow at a controlled rate from one side to the other of the vane as the latter oscillates and thus determine the rate of movement of the axle 30 and parts mounted thereon. The vane 36 may be set in a readily removable manner in a slot or keyway formed in the axle 30 and retained in position by means of the cap end 27". More than one fixed vane and/or more than one oscillatory vane may be provided.

The extractor or deflector blade need not be mounted upon pivotal arms as above described and may, for example, be carried as shown in Fig. 5 by elongated brackets 9' which are secured by links 37 to upward extensions 38 of the supporting bar 16. In this case, the arms 11 carried by the axle 30 of a spring-loading and hydraulic damping device in the form above described with reference to Fig. 4 may be mounted upon the supporting arm 14 so that the arms 11 slidably and freely engage some part of the blade mounting, such as a rod 39 extending between and secured to the elongated blade-supporting brackets 9'. In this manner, the arms 11 will be adapted to press the extractor or deflector blade 8 upon the tyre 5 and to dampen the oscillatory movement as above described.

Obviously, a grease or sluggish oil could be substituted for free running oil and the designs modified to make the viscosity of the grease or sluggish oil the chief damping medium It will be clear that the blade-mounting arrangement described above with reference to Fig. 5, may be modified to embody the spring-loading and hydraulic damping means shown in Fig. 3.

As shown in Figs. 6–8, the blade mounting arms 11a are in the form of inherently resilient members each comprising a length of multi-strand twisted wire cable 40 surrounded by a helical coil spring 41. Each length of wire cable 40 is firmly secured at its upper and lower ends to the stem of an eye bracket 42 and screwthreaded shank 43 respectively.

The one end of the helical coil spring 41 surrounds the stem of the eye bracket 42 and is firmly clamped thereto, while the other end of the coil spring surrounds and is freely slidable along or firmly clamped to the screwthreaded shank 43.

The eye brackets 42 at the upper ends of the resilient arms are adapted to be secured to the brackets 9 of the extractor or deflector blade 8 in an angularly adjustable manner by means of the shackle bolts 10 and nuts 10a as above described, while the screw threaded shanks 43 at the lower ends of the arms are passed through holes formed in the transverse mounting bar 14' and secured thereto by nuts 44, 45. The mounting bar 14' is carried by a screw threaded rod 13 which passes through the flanges of the supporting bar 16 and is clamped thereto in an angularly adjustable manner by nuts 15. By the mounting arrangement just described, the arms 11a may be set and flexed as shown in Fig. 6 so as lightly to press the blade 8 into contact with the tyre 5 while permitting the blade readily to move away from the tyre for the purpose above set forth.

It will be understood that the cable 40 of each arm 11a is flexible, but more or less inert or only slightly resilient in comparison with the surrounding spring 41, so that the two members possess entirely different vibration characteristics and therefore the associated cable and spring members of each arm, which can flex independently, will act to prevent or dampen periodic vibration of the associated member so that the arm as a whole is flexible and resilient in effect but it is rendered incapable of sustained periodic vibration either through contact of the extractor or deflector blade with the rotating tyre or through vibration set up by the vehicle mounted upon the wheel to which the device is applied.

By setting the arms 11a in the flexed position shown in Fig. 6, or alternatively by leaving the cable members 40 relatively slack or slightly flexed in the unflexed outer spring members 41, the latter are permitted slightly to extend so that when a foreign body securely fixed in the tyre contacts the extractor or deflector blade the initial shock is absorbed by the spring members and a shock upon the device as a whole is avoided or minimized by permitting the said blade to move in the direction of rotation of the tyre to a controlled degree before the cable member becomes tensioned. In this case the spring is firmly fixed in relation to the eye bracket 42 and shank 43.

The last described form of the invention is not restricted to the use of flexible cable members. Flexible strips or articulated rods may be used in combination with helical coil springs for example. Alternatively, as shown in Fig. 9, the flexible arms 11b may be provided with a second helical coil spring 46 firmly secured at its ends to the eye bracket 42 and shank 43 respectively in place of the flexible cable 40. The second spring member 46 will of course, be one having a different vibration characteristic to that of the coil spring 41. Alternatively, if so desired, the twisted wire cable, secondary helical coil spring or equivalent movement-damping member may be disposed externally of the main helical spring or equivalent member of the mounting arm with which it is associated.

For example, lengths of spring steel strip or wire, may be employed as the resilient supporting arms for the extractor or deflector blade and, in this case, the damping means employed may be in the form of a wire or strip of spring steel or an inert but flexible metal which is loosely coiled around the spring steel strip or wire forming the supporting arm and secured at the ends to the ends of the said arm, or to the said blade or to the mounting member.

In a further alternative manner of carrying the invention into effect, flexible and inherently resilient arms for mounting the extractor or deflector member in operative position may be formed by sheathing lengths of helically coiled wire or strip in a suitable solid-setting flexible plastic material such as rubber or a suitable flexible synthetic plastic material, which has been found effective as a means for damping the movement of the resilient arm members.

As shown in Fig. 10, such a flexible and resilient mounting arm 11c is in the form shown in Fig. 8 and is encased in a flexible sheath 47 which entirely surrounds the associated spring and cable members while leaving the eye bracket and shank parts uncovered.

Alternatively, the flexible and resilient parts of the arm 11c encased in the plastic sheath 47 may be in the form shown in Fig. 9 or any of the alternative forms mentioned above. Alternatively, if so desired, the arms when thus sheathed in flexible plastic may consist of the helical coil springs 41 only or other resilient and/or flexible members.

It is at present preferred to apply the plastic sheath so that the coilspring members and/or other resilient and/or flexible parts of the arm are firmly embedded in the sheathing material.

In setting the above described forms of the invention in operative position, it is at present preferred to locate the spring arms 11 and deflector blade 8 more or less upright and extending either upwards as shown, or downwards, as desired, with the blade substantially tangential to the tyre surface.

Figs. 11, 12 and 13 illustrate a further practical embodiment of the invention, which at present is more particularly intended for the protection of the tyres of bicycles, tricycles and other light tyred vehicles. In this form, the extractor or deflector means comprises a clearing bar 8'' which is arched intermediate its ends so as closely to fit over the tyre 5a to which it is applied and provided with rearwardly extending lugs 48 for connection to flexible and resilient arms 11e, the further ends of which are secured to the limbs of a V-shaped eye bracket 51 by means of which the said device is mounted in operative position relative to the tyre 5a.

The clearing bar 8'' and mounting bracket 51 may conveniently be formed from suitably stiff metal wire or strip or may be cut from the solid or moulded to shape. The arms 11e are formed from lengths of closely wound helically coiled resilient metallic wire or strip which is biassed or initially tensioned whilst being wound so that the adjacent helical coils tend to press one against the other. It has been found that closely wound, so-called initially tensioned helically coiled arms possess the resilience and flexibility required for the purpose set forth, but by reason of the so-called initial tensioning the wire or coils, are incapable of entering into the periodic vibration which is characteristic of similarly proportioned helical coils springs formed with true wound or unbiassed wire.

The lugs 48 of the clearing bar 8'' and the free ends of the limbs of the mounting bracket 51 may be adapted to make a tight fit in the open ends of the helical coil arms 11e which may be nipped thereon.

The device as last described may be mounted above the tyre 5a as shown, or in a substantially erect position if so desired, and in either case preferably so that the clearing bar 8" lightly contacts the surface of the tyre.

In a modification of the last described embodiment of the invention, the arms 11e may be in the form of truly wound untensioned coils springs which are sheathed in suitable flexible plastic material as above described, or both types combined.

As a means for reducing the tendency of the clearing bar 8" to skip or bounce from the tyre surface the lugs 48 may be located substantially in alignment with the main or highest point of contact of the clearing bar with the tyre or foreign body and, furthermore, may be provided with skid devices as above described.

It will readily be appreciated that by sheathing the blade mounting arms in a flexible plastic material as above described the resilient and flexible metallic parts of the arms are not only secured from periodic vibration but are also suitably protected from the injurious effects of exposure to the natural elements while in use.

Many different ways of putting the invention into effect have been given to illustrate without implied limitation the broadness it is desired to encompass in claim 1.

I claim:

1. A protecting device for a tire of a vehicle comprising an extractor blade for removing foreign bodies from the tire surface, and means carried by the vehicle for supporting the extractor blade in operative relation to the tire surface for movement into engagement with the tire surface and away from said surface, said supporting means including resilient means yieldingly urging said blade towards the tire surface, and damping means cooperating with the resilient means for controlling the resilient effect thereof which urges the blade towards the tire surface and resists movement of the blade away from the tire surface.

2. A protecting device for a tire of a vehicle comprising an extractor blade for removing foreign bodies from the tire surface, and means carried by the vehicle for supporting the extractor blade in operative relation to the tire surface for movement into engagement with the tire surface and away from said surface, said supporting means including resilient means yieldingly urging said blade towards the tire surface, and damping means cooperating with the resilient means for controlling the resilient effect thereof which urges the blade towards the tire surface and resists movement of the blade away from the tire surface, said damping means comprising controlled fluid flow means.

3. A protecting device for a tire of a vehicle comprising an extractor blade for removing foreign bodies from the tire surface, and means carried by the vehicle for supporting the extractor blade in operative relation to the tire surface for movement into engagement with the tire surface and away from said surface, said supporting means including a chamber containing fluid, a spring loaded piston arranged to move in said chamber and connected to the said blade so that the said blade is brought into contact with the said tire surface with a degree of pressure determined by the spring loading of the said piston, and means for the flow of the fluid in the said chamber from one side to the other of the said piston at a predetermined rate so that the rate of movement of the said blade relative to the said tire surface is determined by the rate of flow of the fluid past the said piston.

4. A protecting device for a tire of a vehicle comprising an extractor blade for removing foreign bodies from the tire surface, and means carried by the vehicle for supporting the extractor blade in operative relation to the tire surface for movement into engagement with the tire surface and away from said surface, said supporting means including at least one spring-loaded pivotal member connected to said blade so that the said blade is brought into contact with the said tire surface with a degree of pressure determined by the spring-loading of the said pivotal member, a chamber containing fluid, vane means set to oscillate in the said chamber and coupled to said spring-loaded pivotal member, and means for the flow of the fluid in the said chamber from one side to the other of the said vane means so that the movement of the said clearing means relative to the said tire surface is determined by the rate of flow of the fluid relatively to the said vane means.

5. A protecting device for a tire of a vehicle comprising an extractor blade for removing foreign bodies from the tire surface, and means carried by the vehicle for supporting the extractor blade in operative relation to the tire surface for movement into engagement with the tire surface and away from said surface, said supporting means including spring-loaded means yieldingly urging said blade towards the tire surface and damping means cooperating with the spring-loaded means for controlling the effect thereof which urges the blade towards the tire surface and resists movement of the blade away from the tire surface.

6. A protecting device for a tire of a vehicle according to claim 5 further comprising means for adjusting the loading of said spring-loading means.

7. A protecting device for a tire of a vehicle according to claim 3 further comprising means for adjusting the rate of flow of the fluid relative to the spring loaded piston.

8. A protecting device for a tire of a vehicle according to claim 4 further comprising means for adjusting the rate of flow of the fluid relative to said oscillating vane means.

9. A protecting device for a tire of a vehicle comprising an extractor blade for removing foreign bodies from the tire surface, at least one arm pivotally mounted on the vehicle for supporting the extractor blade in operative relation to the tire surface for movement into engagement with the tire surface and away from said surface, spring loaded means connected with said arm and yieldingly urging said blade towards the tire surface, and damping means connected between the vehicle and the blade for controlling the movements of said blade towards and away from the tire surface.

10. A protecting device for a tire of a vehicle comprising an extractor blade for removing foreign bodies from the tire surface, at least one flexible link member mounted on the vehicle and supporting the extractor blade in operative relation to the tire surface for movement into engagement with the tire surface and away from said surface, and means incorporated in said flexible link member for damping the flexing movements of said link member and the movements of the blade carried thereby towards and away from the tire surface.

11. A protecting device for a tire of a vehicle comprising an extractor blade for removing foreign bodies from the tire surface, at least one inherently resilient flexible link member mounted on the vehicle and supporting the extractor blade in operative relation to the tire surface for movement into engagement with the tire surface and away from said surface, and means incorporated in said flexible link member for damping the flexing movements of said link member and the movements of the blade carried thereby towards and away from the tire surface.

12. A protecting device for a tire of a vehicle comprising an extractor blade for removing foreign bodies from the tire surface, and at least two inherently resilient elements of different vibration characteristics combined to form a composite flexible link member mounted on the vehicle and supporting the extractor blade in operative relation to the tire surface for movement into engagement with the tire surface and away from said surface, one of said resilient elements serving as means for damping the flexible resilient movements of the other and of the composite link member and to also dampen the movements of the blade, carried by the link member, towards and away from the tire surface.

13. A protecting device for a tire of a vehicle comprising an extractor blade for removing foreign bodies from the tire surface, a flexible link member mounted on the vehicle and supporting the extractor blade in operative relation to the tire surface for movement into engagement with the tire surface and away from said surface, said link including at least one flexible and inherently resilient element and at least one flexible, but comparatively inert element, said elements being assembled to flex relatively to each other, said inert element damping the movements of the blade toward and away from the tire surface.

14. A protecting device according to claim 13 in which the inert element is a length of multi-strand cable.

15. A protecting device according to claim 12 in which said inherently resilient elements are coil springs.

16. A protecting device for a tire of a vehicle comprising an extractor blade for removing foreign bodies from the tire surface, at least one flexible link member mounted on the vehicle and supporting the extractor blade in operative relation to the tire surface for movement into engagement with the tire surface and away from said surface, said link member including an inherently resilient element having its resilient characteristics damped for damping the flexing movements of said link member and the movements of the blade carried thereby towards and away from the tire surface.

17. A protecting device for a tire of a vehicle comprising an extractor blade for removing foreign bodies from the tire surface, at least one flexible link member mounted on the vehicle and supporting the extractor blade in operative relation to the tire surface for movement into engagement with the tire surface and away from said surface, said link member including a helical coil spring having its resilient characteristics damped by being of tightly wrapped form with its convolutions engaging each other for damping the flexing movements of said link member and the movements of the blade carried thereby towards and away from the tire surface.

18. A protecting device for a tire of a vehicle comprising an extractor blade for removing foreign *bodies from the tire surface, at least one inherently resilient flexible link member mounted on the vehicle and supporting the extractor blade in operative relation to the tire surface for movement into engagement with the tire surface and away from said surface, and a sheath of solid setting plastic surrounding said link member for damping the flexing movements of said link member and the movements of the blade carried thereby towards and away from the tire surface.

19. A protecting device according to claim 18 in which the flexible link member is a coil spring.

20. A protecting device for a tire of a vehicle comprising an extractor blade for removing foreign bodies from the tire surface, and means carried by the vehicle for supporting the extractor blade in operative relation to the tire surface for movement into engagement with the tire surface and away from said surface, said supporting means including a flexible but comparatively inert multi-strand twisted wire cable encased in a sheath of solid-setting and tough flexible plastic.

21. A device according to claim 1 in which said supporting means include a multi-strand twisted wire cable positioning the blade to rest upon the upper portion of the peripheral surface of the tire.

WILLIAM C. CARLTON.

REFERENCES CITED

The following references are of record in the file of this patent:

UNITED STATES PATENTS

| Number | Name | Date |
|---|---|---|
| 1,397,377 | Harpham | Nov. 15, 1921 |
| 1,848,944 | Frahm et al. | Mar. 8, 1932 |
| 2,407,473 | Carlton | Sept. 10, 1946 |
| 2,509,807 | Carlton | May 30, 1950 |

FOREIGN PATENTS

| Number | Country | Date |
|---|---|---|
| 4,381 | Great Britain | June 25, 1914 |
| 47,198 | Switzerland | Apr. 6, 1909 |
| 86,501 | Switzerland | Sept. 1, 1920 |